(12) United States Patent
Miyamoto

(10) Patent No.: US 9,736,396 B2
(45) Date of Patent: *Aug. 15, 2017

(54) SIGNAL INPUT SWITCHING CIRCUIT, METHOD OF CONTROLLING SIGNAL INPUT SWITCHING CIRCUIT, AND DISPLAY DEVICE

(71) Applicant: NEC Display Solutions, Ltd., Tokyo (JP)

(72) Inventor: Tsuneo Miyamoto, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,506

(22) Filed: Aug. 16, 2016

(65) Prior Publication Data

US 2016/0360122 A1 Dec. 8, 2016

Related U.S. Application Data

(63) Continuation of application No. 14/918,351, filed on Oct. 20, 2015, now Pat. No. 9,438,823.

(30) Foreign Application Priority Data

Oct. 21, 2014 (JP) ................. 2014-214276

(51) Int. Cl.
*H04N 5/268* (2006.01)
*H04N 7/01* (2006.01)

(52) U.S. Cl.
CPC .......... *H04N 5/268* (2013.01); *H04N 7/0122* (2013.01)

(58) Field of Classification Search
CPC ........ H04N 5/268; H04N 7/0122; H04N 7/01; H04N 5/44
USPC ......................... 348/705, 706, 441
See application file for complete search history.

(56) References Cited

U.S. PATENT DOCUMENTS 7,725,916 B2 * 5/2010 Yamada ................ H04N 5/268
                                                                                              725/133
2009/0002551 A1 1/2009 Yamamoto

FOREIGN PATENT DOCUMENTS

JP     2013-258451 A    12/2013

OTHER PUBLICATIONS

U.S. Notice of Allowance dated May 13, 2016 in U.S. Appl. No. 14/918,351.

* cited by examiner

*Primary Examiner* — Sherrie Hsia
(74) *Attorney, Agent, or Firm* — McGinn IP Law Group, PLLC

(57) ABSTRACT

A signal input switching circuit, including a switch circuit including a plurality of input terminals to which signals are respectively applied as input from different signal sources, and the switch circuit supplying as output thereof a signal that is applied as input by way of an input terminal selected from among the plurality of input terminals, and input control units provided corresponding to each of the plurality of input terminals belonging to the switch circuit, controlling signal sources that are connected to input terminals that were not selected by the switch circuit to not present signals to the corresponding input terminals.

14 Claims, 3 Drawing Sheets

SIGNAL INPUT SWITCHING CIRCUIT, METHOD OF CONTROLLING SIGNAL INPUT SWITCHING CIRCUIT, AND DISPLAY DEVICE

CROSS-REFERENCE TO RELATED APPLICATIONS

The present application is a Continuation Application of U.S. patent application Ser. No. 14/918,351, filed on Oct. 20, 2015, which is based on Japanese Patent Application No. 2014-214276, filed on Oct. 21, 2014, the entire contents of which are hereby incorporated by reference.

BACKGROUND OF THE INVENTION

1. Field of the Invention

The present invention relates to a signal input switching circuit, a method of controlling the signal input switching circuit, and a display device.

2. Description of the Related Art

There are display systems in which a display device such as a projector is connected to an outside apparatus such as a personal computer by way of a cable, a picture signal is applied as input to the display device from the outside apparatus, and a picture is then displayed on the display device (for example, refer to Japanese Unexamined Patent Application Publication No. 2013-258451).

SUMMARY OF THE INVENTION

The above-described display system includes a configuration in which a plurality of outside apparatuses are connected to the display device, and pictures that accord with picture signals that are applied as input from each of the plurality of outside apparatuses are switched and displayed in accordance with the operation of a user.

When a large number of outside apparatuses are connected to the display device, a switch circuit is used to perform switching of the pictures. However, in this case, malfunctioning may occur due to crosstalk of the switch circuit. For example, even though there is actually no input of a signal by way of an input terminal on the selected side in the switch circuit, the input of a signal by way of the input terminal on the selected side may be erroneously detected in a detection unit according to the input of a signal on the non-selected side.

It is an object of the present invention to provide a signal input switching circuit, a method of controlling the signal input switching circuit, and a display device that can reduce the occurrence of malfunctioning that arises due to switch circuit crosstalk.

The signal input switching circuit of the present invention for realizing the above-described object includes:

a plurality of switch circuits each having a plurality of input terminals to which signals are applied as input from signal sources and each supplying as output a signal that was applied as input by way of any of the input terminals that was selected from among the plurality of input terminals;

input control units that are provided corresponding to each of the plurality of input terminals belonging to each of the plurality of switch circuits and that control the input of signals from the signal sources by way of the corresponding input terminals;

an input acceptance unit that accepts operation input; and a control unit that, in accordance with input to the input acceptance unit, causes each of said switch circuits to select any of the plurality of input terminals belonging to that switch circuit and supply as output a signal that is received as input by way of the selected input terminal, and further, causes input control units corresponding to input terminals that were not selected to not supply signals from signal sources that are connected to the corresponding input terminals.

The method of controlling the signal input switching circuit of the present invention for achieving the above-described object is a control method of a signal input switching circuit in which the signal input switching circuit is provided with:

a plurality of switch circuits each having a plurality of input terminals to which signals are applied as input from signal sources by way of predetermined cables and each supplying as output a signal that was applied as input by way of any input terminal that was selected from among the plurality of input terminals;

input control units that are provided corresponding to each of the plurality of input terminals belonging to each of the plurality of switch circuits and that control the input of signals from signal sources by way of corresponding input terminals; and an input acceptance unit that accepts operation input;

the control method including steps of, in accordance with input to the input acceptance unit, causing each of the switch circuits to select any of the plurality of input terminals and supply as output the signal that was received as input by way of the selected input terminal, and further, causing input control units corresponding to input terminals that were not selected to not supply as output signals from signal sources that are connected to the corresponding input terminals.

The display device of the present invention for realizing the above-described object includes:

the above-described signal input switching circuit;

switching circuits that supply as output any of signals that were supplied from each of the plurality of switch circuits; and a display unit;

wherein the signals are picture signals; and the display unit displays pictures in accordance with the picture signals that were supplied from the switching circuits.

The present invention enables reducing of the occurrence of malfunctioning that arises from crosstalk of switch circuits.

The above and other objects, features, and advantages of the present invention will become apparent from the following description with reference to the accompanying drawing, which illustrate examples of the present invention.

DETAILED DESCRIPTION OF THE PREFERRED EMBODIMENTS

Exemplary embodiments of the present invention are next described with reference to the accompanying drawings.

First Exemplary Embodiment

Figure 1:
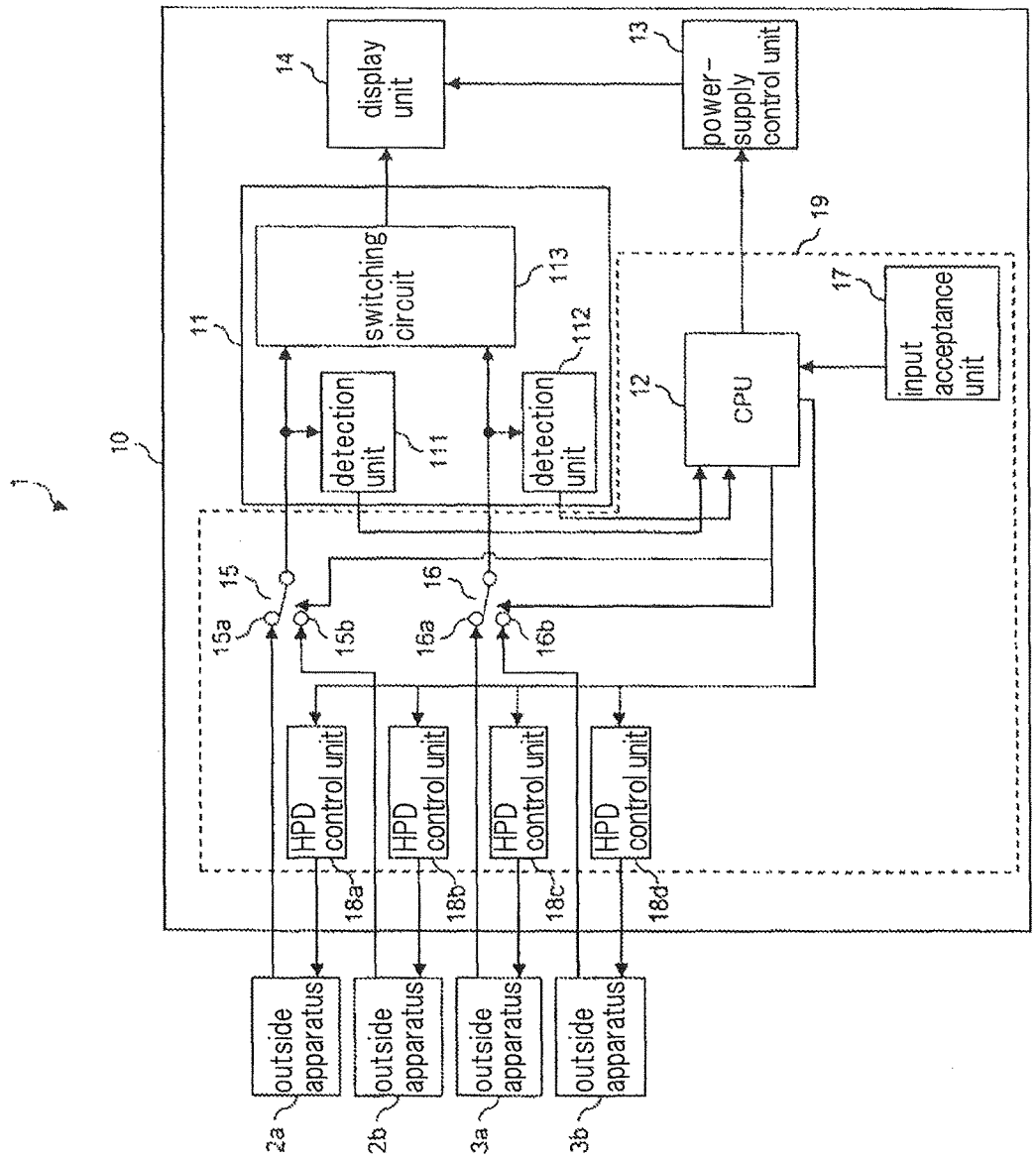
FIG. 1 shows the configuration of the display system according to the first exemplary embodiment of the present invention.

FIG. 1 shows the configuration of display system 1 according to the first exemplary embodiment of the present invention.

Display system 1 shown in FIG. 1 includes outside apparatuses 2a, 2b, 3a, and 3b and display device 10.

Outside apparatuses 2a, 2b, 3a, and 3b are connected to display device 10 by way of cables and are the signal sources that supply picture signals to display device 10. When an outside apparatus is connected to display device 10, a process referred to as "HPD" (Hot Plug Detect) is carried out between the outside apparatus and display device 10, and the connection with display device 10 is detected in the outside apparatus. More specifically, a data line that is used for transmitting picture signals and an HPD line that is used in HPD are typically included in the cable that connects the outside apparatus and display device 10. When an outside apparatus and display device 10 are connected, a predetermined signal is transmitted from the outside apparatus to display device 10 by way of the data line. Display device 10, upon receiving the predetermined signal, transmits an HPD signal of a predetermined logic level to the outside apparatus by way of the HPD line. The outside apparatus, upon receiving the HPD signal of the predetermined logic level, detects the connection with display device 10. It is assumed hereinbelow that the outside apparatus detects that display device 10 is connected when the logic level of the HPD signal is the High level.

Display device 10 includes scaler 11, CPU (Central Processing Unit) 12, power-supply control unit 13, display unit 14, switch circuits 15 and 16, input acceptance unit 17, and HPD control units 18a, 18b, 18c, and 18d. HPD control units 18a, 18b, 18c, and 18d are examples of the input control unit. In addition, CPU 12 is an example of the control unit. In the following explanation, HPD control units 18a, 18b, 18c, and 18d are referred to as HPD control unit 18 when they are not individually distinguished. In addition, outside apparatuses 2a and 2b are referred to as outside apparatuses 2 when not distinguished, and outside apparatuses 3a and 3b are referred to as outside apparatuses 3 when not distinguished.

Scaler 11 supplies one of the signals received as input from outside apparatuses 2 and 3 by way of switch circuits 15 and 16 (to be described) to display unit 14 as the picture signal that is the object of processing (object of display). Scaler 11 here performs resolution conversion of the picture signal that is the object of processing according to the resolution of display unit 14 and supplies the picture signal that follows conversion to display unit 14. In the following explanation, scaler 11 is assumed to have two picture signal input terminals (not shown in FIG. 1).

Scaler 11 has detection units 111 and 112 and switching circuit 113.

Detection unit 111 detects the presence or absence of the input of a picture signal by way of one of the input terminals of scaler 11 and supplies the detection result to CPU 12. Detection unit 112 detects the presence or absence of the input of a picture signal by way of the other input terminal of scaler 11 and supplies the detection result to CPU 12.

Switching circuit 113 carries out switching of, from among the picture signals that are received as input by way of the two input terminals belonging to scaler 11, the picture signal that is to be supplied as the display-object picture signal.

CPU 12 controls the overall operation of display device 10. For example, upon the output of a detection result that indicates that a picture signal has been received as input from detection unit 111 or detection unit 112, CPU 12 instructs power-supply control unit 13 to supply power to display unit 14. CPU 12 further controls the operation (signal output) of switch circuits 15 and 16 in accordance with input to input acceptance unit 17 (to be described). CPU 12 further controls the operation of HPD control units 18a, 18b, 18c, and 18d in accordance with input to input acceptance unit 17.

Power-supply control unit 13 supplies power to display unit 14 under the control of CPU 12.

Display unit 14 receives the supply of power to operate, and displays a picture in accordance with the picture signal supplied from scaler 11.

Switch circuit 15 has input terminals 15a and 15b. Outside apparatus 2a is connected to input terminal 15a, and outside apparatus 2b is connected to input terminal 15b. Switch circuit 15 selects input terminal 15a or 15b under the control of CPU 12 and supplies the picture signal that was received as input from the outside apparatus by way of the selected input terminal to scaler 11 (one of the input terminals belonging to scaler 11).

Switch circuit 16 has input terminals 16a and 16b. Outside apparatus 3a is connected to input terminal 16a and outside apparatus 3b is connected to input terminal 16b. Switch circuit 16 selects input terminal 16a or 16b under the control of CPU 12 and supplies the picture signal that is received as input from the outside apparatus by way of the selected input terminal to scaler 11 (the other input terminal belonging to scaler 11).

In this way, the provision of switch circuits 15 and 16 enables a number of outside apparatuses that is greater than the number of input terminals of scaler 11 to be connected to a display device and enables the switching and display of pictures that accord with picture signals received as input from each outside apparatus according to, for example, the operation of a user.

Input acceptance unit 17 receives operation input and supplies to CPU 12 a signal according to the operation that was accepted.

HPD control units 18a, 18b, 18c, and 18d are provided corresponding to input terminals 15a, 15b, 16a, and 16b, respectively. HPD control units 18 control the input of signals (picture signals) from outside apparatuses by way of the corresponding input terminals in accordance with the control of CPU 12.

CPU 12, switch circuits 15 and 16, input acceptance unit 17, and HPD control units 18a, 18b, 18c, and 18d make up signal input switching circuit 19.

The operation of signal input switching circuit 19 is next described.

In the following explanation, it is assumed that outside apparatus 2a is connected to input terminal 15a of switch circuit 15 and outside apparatus 2b is connected to input terminal 15b, as shown in FIG. 1. It is further assumed that outside apparatus 3a is connected to input terminal 16a of switch circuit 16 and outside apparatus 3b is connected to input terminal 16b.

It is further assumed that operation input that indicates that outside apparatus 2a (input terminal 15a) and outside apparatus 3a (input terminal 16a) are to be selected has been carried out by way of input acceptance unit 17. In this case, CPU 12 causes switch circuit 15 to select input terminal 15a and causes switch circuit 16 to select input terminal 16b, as shown in FIG. 1.

CPU 12 next instructs HPD control units 18a and 18c that correspond to the input terminals of the selected sides (input terminals 15a and 16a) to supply HPD signals of the High level (first logic level) that indicate that the connection with display device 10 is effective. CPU 12 further instructs HPD control units 18b and 18d that correspond to input terminals of the sides that were not selected (input terminals 15b and 16b) to supply HPD signals of the Low level (second logic level).

HPD control unit 18a receives the instruction of CPU 12 and supplies a High-level HPD signal to outside apparatus 2a by way of a cable. HPD control unit 18c further receives the instruction of CPU 12 and supplies a High-level HPD signal to outside apparatus 3a by way of a cable. Upon receiving the High-level HPD signals, outside apparatuses 2a and 3a detect that a connection has been made to display device 10 and begin the output of picture signals.

HPD control unit 18b receives the instruction of CPU 12 and supplies a Low-level HPD signal to outside apparatus 2b by way of a cable. HPD control unit 18d further receives the instruction of CPU 12 and supplies a Low-level HPD signal to outside apparatus 3b by way of a cable. Upon receiving the Low-level HPD signals, outside apparatuses 2b and 3b detect that they are not connected to display device 10 and thus do not supply picture signals. The lack of supply of picture signals from outside apparatuses 2b and 3b reduce the occurrence of crosstalk in switch circuits 15 and 16, thereby allowing a reduction of the occurrence of malfunction arising from crosstalk.

Thus, according to the present exemplary embodiment, signal input switching circuit 19 includes switch circuits 15 and 16 that supply signals received as input by way of any input terminals selected from among a plurality of input terminals, and input acceptance unit 17. In addition, signal input switching circuit 19 is further provided with HPD control units 18, which are provided corresponding to each of input terminals (15a, 15b, 16a, and 16b) belonging to each of switch circuits 15 and 16 and which control the input of signals from outside apparatuses by way of the corresponding input terminals, and CPU 12. In accordance with the input to input acceptance unit 17, CPU 12 causes each switch circuit to select any of the plurality of input terminals belonging to each switch circuit and to supply the signal that was received as input by way of the input terminal that was selected. CPU 12 further causes HPD control units 18 that correspond to input terminals that were not selected to not supply signals from outside apparatuses that are connected to the corresponding input terminals.

By preventing the supply of picture signals from outside apparatuses that are connected to input terminals that were not selected in switch circuits 15 and 16, the occurrence of crosstalk in switch circuits 15 and 16 is reduced, and the occurrence of malfunctions caused by crosstalk can be reduced.

The use of circuits having a high capability of reducing the occurrence of crosstalk as switch circuits 15 and 16 enables a reduction of the occurrences of malfunctions that arise due to crosstalk. However, such circuits having a high capability for reducing the occurrence of crosstalk are typically expensive, and the use of these expensive circuits therefore leads to cost increases. According to the present invention, the occurrence of malfunctions arising due to crosstalk can be reduced without the use of expensive circuits.

Second Exemplary Embodiment

Interfaces for exchanging picture signals between outside apparatuses and a display device include DVI (Digital Visual Interfaces) or HDMI (High Definition Multimedia Interfaces) (registered trademark). In some cases, an outside apparatus that conforms to DVI and an outside apparatus that conforms to HDMI are connected to a display device, and in the second exemplary embodiment of the present invention, a display system is described that, by means of a simple device configuration, switches between pictures from signal sources even when connected to an outside apparatus that conforms to DVI and an outside apparatus that conforms to HDMI.

Figure 2:
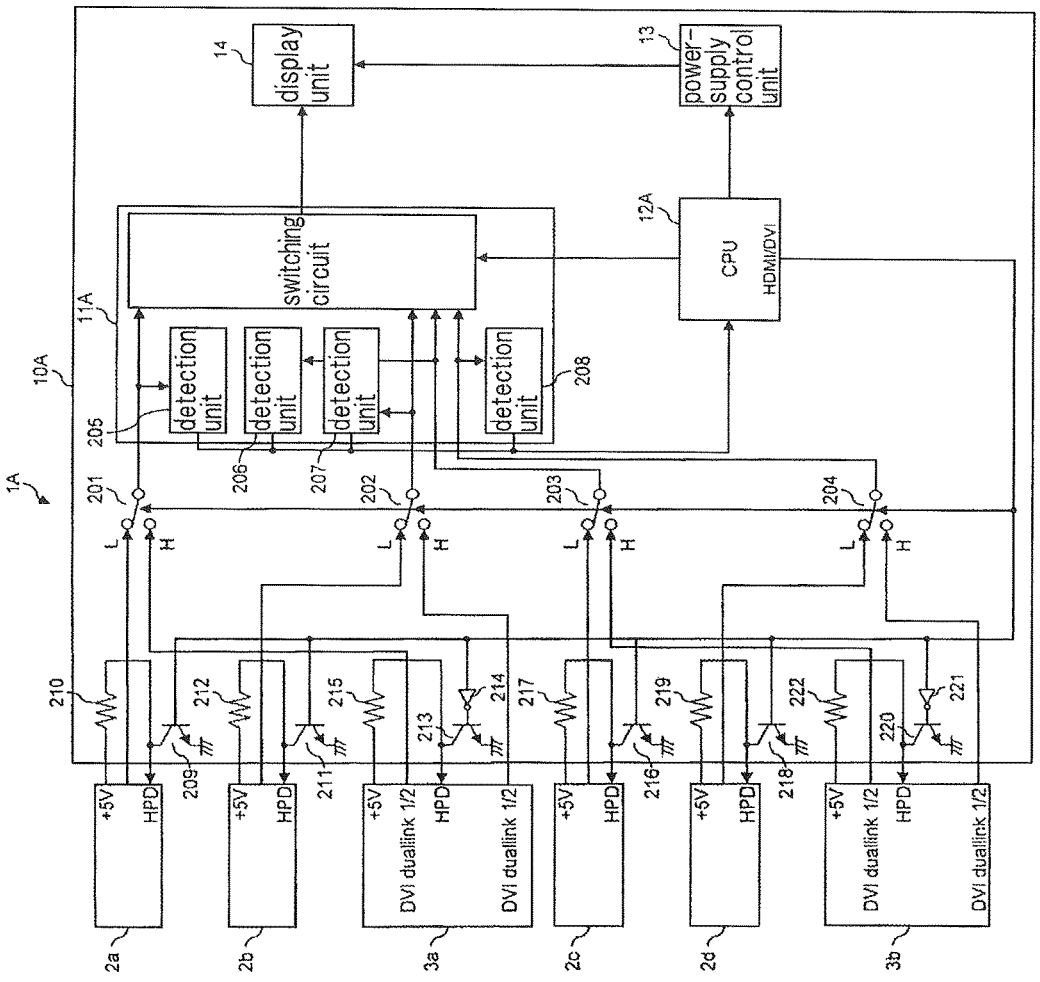
FIG. 2 shows the configuration of the display system according to the second exemplary embodiment of the present invention.

FIG. 2 shows the configuration of display system 1A according to the present exemplary embodiment.

Display system 1A shown in FIG. 2 includes outside apparatuses 2a, 2b, 2c, and 2d; outside apparatuses 3a and 3b; and display device 10A.

Outside apparatuses 2a, 2b, 2c, 2d, 3a, and 3b are connected to display device 10A by way of cables and are the signal sources that supply picture signals to display device 10A. In the following description, outside apparatuses 2a, 2b, 2c, and 2d are assumed to conform to HDMI. In this case, each of outside apparatuses 2a, 2b, 2c and 2d has a picture signal output terminal, an output terminal of voltage +5V and an HPD terminal to which a control signal is applied as input from display device 10A. Further, outside apparatuses 3a and 3b in the following description are assumed to conform to DVI. In this case, each of outside apparatuses 3a and 3b includes two terminals (DVI dual-link 1/2 and DVI dual-link 2/2) that supply picture signals, an output terminal of voltage +5V, and an input terminal that receives as input control signals from display device 10A.

The configuration of display device 10A is next described. In FIG. 2, constructions identical to FIG. 1 are given the same reference numbers and redundant description is omitted. In FIG. 2, moreover, description is also omitted regarding input acceptance unit that receives operation input.

Display device 10A of the present exemplary embodiment differs from display device 10 of the first exemplary embodiment in that switch circuits 15 and 16 are deleted and switch circuits 201-204 are added. In addition, display device 10A of the present exemplary embodiment differs from display device 10 of the first exemplary embodiment in that transistors (Tr) 209, 211, 213, 216, 218, and 220, resistors 210, 212, 215, 217, 219, and 222, and inverter circuits 214 and 221 have been added. In addition, display device 10A of the present exemplary embodiment further differs from display device 10 of the first exemplary embodiment in that scaler 11 has been altered to scaler 11A and CPU 12 has been altered to CPU 12A. Scaler 11A differs from scaler 11 in that detection units 111 and 112 have been deleted, and detection units 205-208 have been added.

Switch circuit 201 has two input terminals, the picture signal output terminal of outside apparatus 2a being connected to one input terminal, and the picture signal output terminal (DVI dual-link 1/2) of outside apparatus 3a being connected to the other input terminal. Under the control of CPU 12A, switch circuit 201 selects either one of the two input terminals and supplies the picture signal that is applied as input from the outside apparatus by way of the selected input terminal to scaler 11A.

Switch circuit 202 has two input terminals, the picture signal output terminal of outside apparatus 2b being connected to one input terminal, and the picture signal output terminal (DVI dual-link 2/2) of outside apparatus 3a being connected to the other input terminal. Under the control of CPU 12A, switch circuit 202 selects either one of the two input terminals and supplies the picture signal that is received from the outside apparatus by way of the selected input terminal to scaler 11A.

Switch circuit 203 has two input terminals, the picture signal output terminal of outside apparatus 2c being connected to one input terminal, and the picture signal output terminal (DVI dual-link 1/2) of outside apparatus 3b being connected to the other input terminal. Under the control of CPU 12A, switch circuit 203 selects either one of the two input terminals and supplies the picture signal that is received from the outside apparatus by way of the selected input terminal to scaler 11A.

Switch circuit 204 has two input terminals, the picture signal output terminal of outside apparatus 2d being connected to one input terminal, and the picture signal output terminal (DVI dual-link 2/2) of outside apparatus 3b being connected to the other input terminal. Switch circuit 204 selects either one of the two input terminals under the control of CPU 12A and supplies the picture signal applied as input from the outside apparatus by way of the selected input terminal to scaler 11A.

For the sake of convenience in the following explanation, of the two input terminals belonging to each of switch circuits 201-204, the input terminal that connects to the outside apparatus (outside apparatus 2) that conforms to HDMI may be referred to as the L-side input terminal, and the input terminal that connects to the outside apparatus (outside apparatus 3) that conforms to DVI may be referred to as the H-side input terminal.

Transistor 209 has its base connected to CPU 12A, its collector connected to both the output terminal of voltage +5V of outside apparatus 2a by way of resistor 210 and the HPD terminal of outside apparatus 2a, and its emitter connected to ground.

Transistor 211 has its base connected to CPU 12A, its collector connected to both the output terminal of voltage +5V of outside apparatus 2b by way of resistor 212 and the HPD terminal of outside apparatus 2b, and its emitter connected to ground.

Transistor 213 has its base connected to CPU 12A by way of inverter circuit 214, its collector connected to both the output terminal of voltage +5V of outside apparatus 3a by way of resistor 215 and the HPD terminal of outside apparatus 3a, and its emitter connected to ground.

Transistor 216 has its base connected to CPU 12A, its collector connected to both the output terminal of voltage +5V of outside apparatus 2c by way of resistor 217 and the HPD terminal of outside apparatus 2c, and its emitter connected to ground.

Transistor 218 has its base connected to CPU 12A, its collector connected to both the output terminal of voltage +5V of outside apparatus 2d by way of resistor 219 and the HPD terminal of outside apparatus 2d, and its emitter connected to ground.

Transistor 220 has its base connected to CPU 12 by way of inverter circuit 221, its collector connected to both the output terminal of voltage +5V of outside apparatus 3b by way of resistor 222 and the HPD terminal of outside apparatus 3b, and its emitter connected to ground.

Each of transistors 209, 211, 213, 216, 218, and 220 is provided corresponding to an outside apparatus that is connected to display device 10A and is equivalent to HPD control unit 18 in the first exemplary embodiment.

Detection unit 205 detects the presence or absence of the input of picture signals by way of switch circuit 201 and supplies the detection result to CPU 12A. Detection unit 206 detects the presence or absence of the input of picture signals by way of switch circuit 203 and supplies the detection result to CPU 12A. Detection unit 207 detects the presence or absence of the input of picture signals by way of switch circuit 202 and supplies the detection result to CPU 12A. Detection unit 208 detects the presence or absence of the input of picture signals by way of switch circuit 204 and supplies the detection result to CPU 12A.

CPU 12A controls the overall operation of display device 10A. When a detection result is supplied from detection units 205-208 indicating that a picture signal is being received as input, CPU 12A instructs power-supply control unit 13 to supply power to display unit 14. In addition, CPU 12A supplies control signals (hereinbelow referred to as HDMI/DVI signals) that control the operation of switch circuits 201-204 and transistors 209, 211, 213, 216, 218, and 220 in accordance with the input to input acceptance unit (not shown in FIG. 2).

Figure 3:
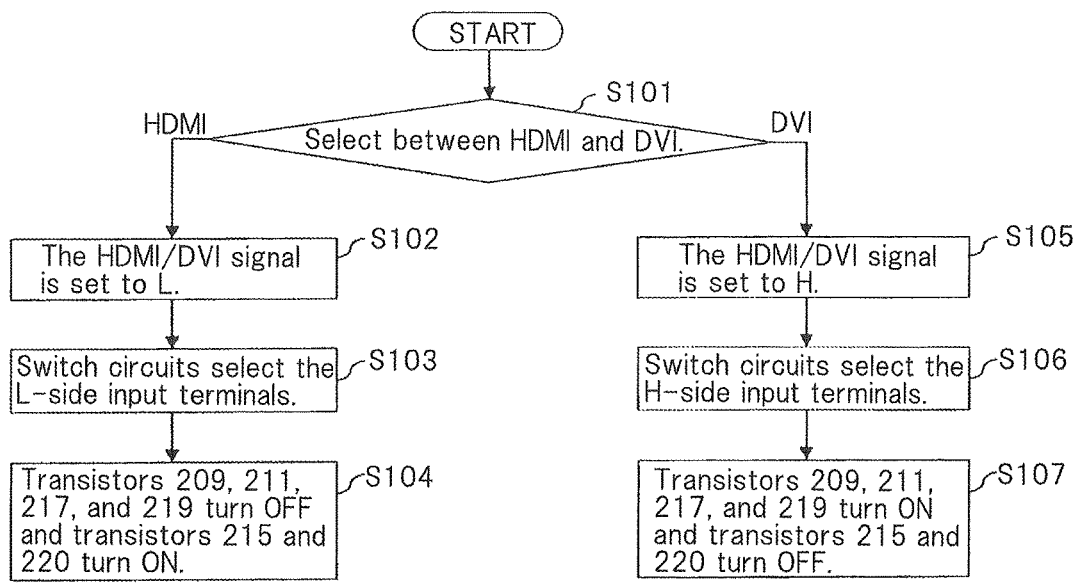
FIG. 3 is a flow chart showing the operation of the display device shown in FIG. 2.

The operation of display device 10A is next described with reference to the flow chart shown in FIG. 3.

CPU 12A first selects HDMI or DVI in accordance with the operation input to the input acceptance unit (Step S 101).

Having selected HDMI, CPU 12A supplies a Low-level HDMI/DVI signal (Step S102).

When the Low-level HDMI/DVI signal has been supplied from CPU 12A, each of switch circuits 201-204 selects the L-side input terminal, i.e., the input terminal that is connected to the picture signal output terminal of an outside apparatus that conforms to HDMI (Step S103).

In addition, when the Low-level HDMI/DVI signal has been supplied from CPU 12A, transistors 209, 211, 216, and 218 turn OFF. In addition, transistors 213 and 220 receive as input signal in which the HDMI/DVI signal has been inverted by inverter circuits 214 and 221, i.e., High-level signals. Accordingly, transistors 213 and 220 turn ON (Step S104).

When transistors 209, 211, 216, and 218 turn OFF, voltage of +5V (High-level HPD signal) is applied to the HPD terminals of each of outside apparatuses 2a-2d. As a result, outside apparatuses 2a-2d detect that the connection with display device 10A is working and begin the output of picture signals.

When transistors 213 and 220 turn ON, the HPD terminals of each of outside apparatuses 3a and 3b become the ground potential (Low-level HPD signals are received as input). As a result, outside apparatuses 3a and 3b detect that the connection with display device 10A is not working and do not supply picture signals.

Accordingly, while picture signals are supplied from outside apparatuses 2a-2d that conform to HDMI, picture signals from outside apparatuses 3a and 3b that conform to DVI are not supplied. As a result, the occurrence of crosstalk in switch circuits 201-204 is reduced, and the occurrence of malfunctions arising due to crosstalk can be decreased.

Upon selecting DVI, CPU 12A supplies a High-level HDMI/DVI signal (Step S105).

When a High-level HDMI/DVI signal is supplied from CPU 12A, each of switch circuits 201-204 selects an H-side input terminal, i.e., an input terminal that is connected to the picture signal output terminal of an outside apparatus that conforms to DVI (Step S106).

When a High-level HDMI/DVI signal is supplied from CPU 12A, transistors 209, 211, 216, and 218 turn ON. On the other hand, a signal in which the HDMI/DVI signal is inverted by inverter circuits 214 and 221, i.e., a Low-level signal, is applied as input to each of transistors 213 and 220. Accordingly, transistors 213 and 220 turn OFF (Step S107).

When transistors 209, 211, 216, and 218 turn ON, the HPD terminals of each of outside apparatuses 2a-2d become the ground potential (receive as input Low-level HPD signals). As a result, outside apparatuses 2a-2d detect that the connection with display device 10A is not working and do not supply picture signals.

When transistors 213 and 220 turn ON, voltage of +5V (High-level HDP signal) is applied as input to the HPD terminals of each of outside apparatuses 3a and 3b. As a result, outside apparatuses 3a and 3b detect that the connection with display device 10A is working and begin the output of picture signals.

Accordingly, while picture signals from outside apparatuses 2a-2d that conform to HDMI are no longer supplied, picture signals from outside apparatuses 3a and 3b that conform to DVI are supplied. As a result, the occurrence of crosstalk in switch circuits 201-204 is reduced, and the occurrence of malfunctions that arise due to crosstalk can be decreased.

In the present exemplary embodiment, a common signal (HDMI/DVI signal) was applied as input to each switch circuit and each transistor. As a result, the signal line for controlling each switch circuit and the signal line for controlling each transistor can be shared, and a simplification of the configuration of the device can therefore be achieved.

While preferred embodiments of the present invention have been described using specific terms, such description is for illustrative purposes only, and it is to be understood that changes and variations may be made without departing from the spirit or scope of the following claims.

What is claimed is:

1. A signal input switching circuit, comprising:
   a switch circuit including a plurality of input terminals to which signals are respectively applied as input from different signal sources, wherein said switch circuit supplies as output thereof a signal that is applied as input by way of an input terminal selected from among the plurality of input terminals; and
   input control units provided corresponding to each of the plurality of input terminals belonging to said switch circuit, preventing signal sources that are connected to input terminals that were not selected by said switch circuit from supplying signals to the corresponding input terminals.

2. The signal input switching circuit as set forth in claim 1, further comprising:
   an input acceptance unit that accepts an operation input signal, wherein said switch circuit selects one of the plurality of input terminals in accordance with an input signal to said input acceptance unit.

3. The signal input switching circuit as set forth in claim 1, wherein said input control unit corresponding to said input terminal that was selected outputs a signal of a first logic level indicating that a connection is working, and input control units corresponding to said input terminals that were not selected output a signal of a second logic level to signal sources connected to the corresponding input terminals.

4. The signal input switching circuit as set forth in claim 1, further comprising a first transistor comprising:
   a base connected to a control unit of the input control units;
   a collector connected to output terminals of one of the signal sources; and
   an emitter connected to ground.

5. The signal input switching circuit as set forth in claim 4, further comprising a second transistor comprising:
   a base connected to the control unit by an inverter circuit;
   a collector connected to output terminals of another one of the signal sources; and
   an emitter connected to the ground.

6. The signal input switching circuit as set forth in claim 5, wherein, after a signal is supplied from the control unit, the first transistor turns OFF and the second transistor receives an input signal in which the signal supplied from the control unit is inverted by the inverter circuit, and the second transistor turns ON.

7. A display device, comprising:
   the signal input switching circuit as set forth in claim 1;
   a plurality of ones of said switch circuit,
   switching circuits that supply as output any of signals that were supplied from each of said plurality of switch circuits; and
   a display unit;
   wherein:
   said signals include picture signals; and
   said display unit displays pictures in accordance with picture signals that were supplied from said switching circuits.

8. The display device as set forth in claim 7, further comprising:
   a scaler that supplies one of the signals received as the input from the signal sources by the switch circuits to the display unit as a picture signal for display.

9. The display device as set forth in claim 8, wherein the scaler performs a resolution conversion of the picture signal according to a resolution of the display unit and supplies the picture signal that follows the conversion to the display unit.

10. The display device as set forth in claim 8, wherein a number of the signal sources is greater than a number of input terminals of the scaler.

11. The signal switching circuit as set for the in claim 1, wherein the input control units comprise Hot-Plug Detect (HPD) control units.

12. A method of controlling a signal input switching circuit, said method comprising:
   providing a switch circuit including a plurality of input terminals to which signals are respectively applied as input from different signal sources, wherein said switch circuit supplies as output thereof a signal that is applied as input by way of an input terminal selected from among the plurality of input terminals; and
   providing input control units corresponding to each of the plurality of input terminals belonging to said switch circuit, and preventing signal sources that are connected to input terminals that were not selected by said switch circuit from supplying signals to the corresponding input terminals.

13. A signal input switching circuit, comprising:
   a switch circuit including at least a first input terminal to which a first signal is applied as input from a first signal source and a second input terminal to which a second signal is applied as input from a second signal source, and said switch circuit selecting at least one of signals input into the switch circuit as output; and
   a first input control unit provided to the first input terminal, controlling the first signal source not to supply the first signal if the first signal is not selected by the switch circuit.

14. The signal input switching circuit as set forth in claim 13, further comprising:
   a second input control unit provided to the second input terminal, controlling the second signal source not to supply the second signal if the second signal is not selected by the switch circuit.

\* \* \* \* \*